(12) United States Patent
DePaschoal

(10) Patent No.: US 10,530,973 B2
(45) Date of Patent: Jan. 7, 2020

(54) VISION SYSTEMS USING MULTIPLE CAMERAS

(71) Applicant: Roberto DePaschoal, Vancouver (CA)

(72) Inventor: Roberto DePaschoal, Vancouver (CA)

( * ) Notice: Subject to any disclaimer, the term of this patent is extended or adjusted under 35 U.S.C. 154(b) by 0 days.

(21) Appl. No.: 14/876,704

(22) Filed: Oct. 6, 2015

(65) Prior Publication Data

US 2016/0142596 A1 May 19, 2016

Related U.S. Application Data

(60) Provisional application No. 62/071,803, filed on Oct. 6, 2014.

(51) Int. Cl.
*H04N 5/225* (2006.01)
*H04N 5/232* (2006.01)
*H04N 5/247* (2006.01)

(52) U.S. Cl.
CPC ....... *H04N 5/2252* (2013.01); *H04N 5/23238* (2013.01); *H04N 5/23293* (2013.01); *H04N 5/247* (2013.01)

(58) Field of Classification Search
CPC .. H04N 5/2252; H04N 5/23293; H04N 5/247; H04N 5/23238; H04N 5/2259; H04N 5/332; G02B 27/0172; G02B 27/0176; G02B 2027/0138; G02B 2027/0156; G02B 2027/0127; G02B 2027/0123; G02B 2027/0178; G02B 7/12; G02B 13/06; G02B 13/16; G02B 5/10; G02C 11/00; G02C 5/146; G02C 5/001; G03B 27/00; G02F 1/01; G08B 13/19647; G08B 13/19643; G08B 13/19608; G08B 13/19632; G08B 13/1963; Y10T 74/20207
See application file for complete search history.

(56) References Cited

U.S. PATENT DOCUMENTS

| | | | | |
|---|---|---|---|---|
| 5,721,585 A * | 2/1998 | Keast | ..................... | G02B 13/06 348/36 |
| 5,774,569 A * | 6/1998 | Waldenmaier | ..... | G06K 9/00771 348/143 |
| 6,141,034 A * | 10/2000 | McCutchen | ........... | G02B 27/22 348/36 |
| 6,587,597 B1 * | 7/2003 | Nakao | ..................... | H04N 5/232 348/139 |
| 6,683,584 B2 * | 1/2004 | Ronzani | ............... | G02B 27/017 345/8 |
| 7,200,248 B2 * | 4/2007 | Horiguchi | .......... | G06K 9/00912 348/78 |

(Continued)

*Primary Examiner* — Dramos Kalapodas
(74) *Attorney, Agent, or Firm* — Smiths IP

(57) ABSTRACT

Devices providing a distortion-free panoramic image covering a 180° field of view, a single frame or a three dimensional image, comprising a multi-camera assembly, which provides images to a light sensor on a related circuit board, which in turn sends the images to a display for a user. The vision system is primarily directed to vehicle vision systems, allowing drivers to see areas behind and around the vehicle, but may be provided in several alternative applications, including a smart phone type assembly, webcam and other cameras, an eyeglasses configuration and a headwear mounted assembly. A device to simplify sensor adjustment to fine tune image displays is also disclosed.

13 Claims, 8 Drawing Sheets

(56) References Cited

U.S. PATENT DOCUMENTS

| | | | | |
|---|---|---|---|---|
| 7,381,952 B2* | 6/2008 | Teich | ............... | G08B 13/19641 |
| | | | | 250/330 |
| 8,253,777 B2* | 8/2012 | Lin | ..................... | H04N 5/2258 |
| | | | | 348/36 |
| 8,277,087 B2* | 10/2012 | Chien | ................. | H04N 5/2354 |
| | | | | 362/298 |
| 8,466,806 B2* | 6/2013 | Schofield | ............... | B60Q 1/346 |
| | | | | 340/435 |
| 2004/0125443 A1* | 7/2004 | Nakajima | .............. | G02B 23/18 |
| | | | | 359/407 |
| 2005/0146607 A1* | 7/2005 | Linn | ....................... | B60R 1/00 |
| | | | | 348/148 |
| 2006/0023105 A1* | 2/2006 | Kostrzewski | ........ | G06T 3/0018 |
| | | | | 348/335 |
| 2006/0139475 A1* | 6/2006 | Esch | ..................... | G03B 37/04 |
| | | | | 348/340 |
| 2007/0182812 A1* | 8/2007 | Ritchey | ................ | H04N 5/2254 |
| | | | | 348/36 |
| 2010/0045773 A1* | 2/2010 | Ritchey | ................. | G02B 13/06 |
| | | | | 348/36 |
| 2010/0045774 A1* | 2/2010 | Len | ........................ | G02B 13/06 |
| | | | | 348/36 |
| 2010/0097443 A1* | 4/2010 | Lablans | ................ | G03B 37/00 |
| | | | | 348/36 |
| 2013/0021448 A1* | 1/2013 | Fairburn | ............. | H04N 13/243 |
| | | | | 348/47 |
| 2014/0132804 A1* | 5/2014 | Guissin | ................. | G02B 13/06 |
| | | | | 348/239 |
| 2014/0193144 A1* | 7/2014 | Coster | ................. | F16M 11/045 |
| | | | | 396/325 |

* cited by examiner

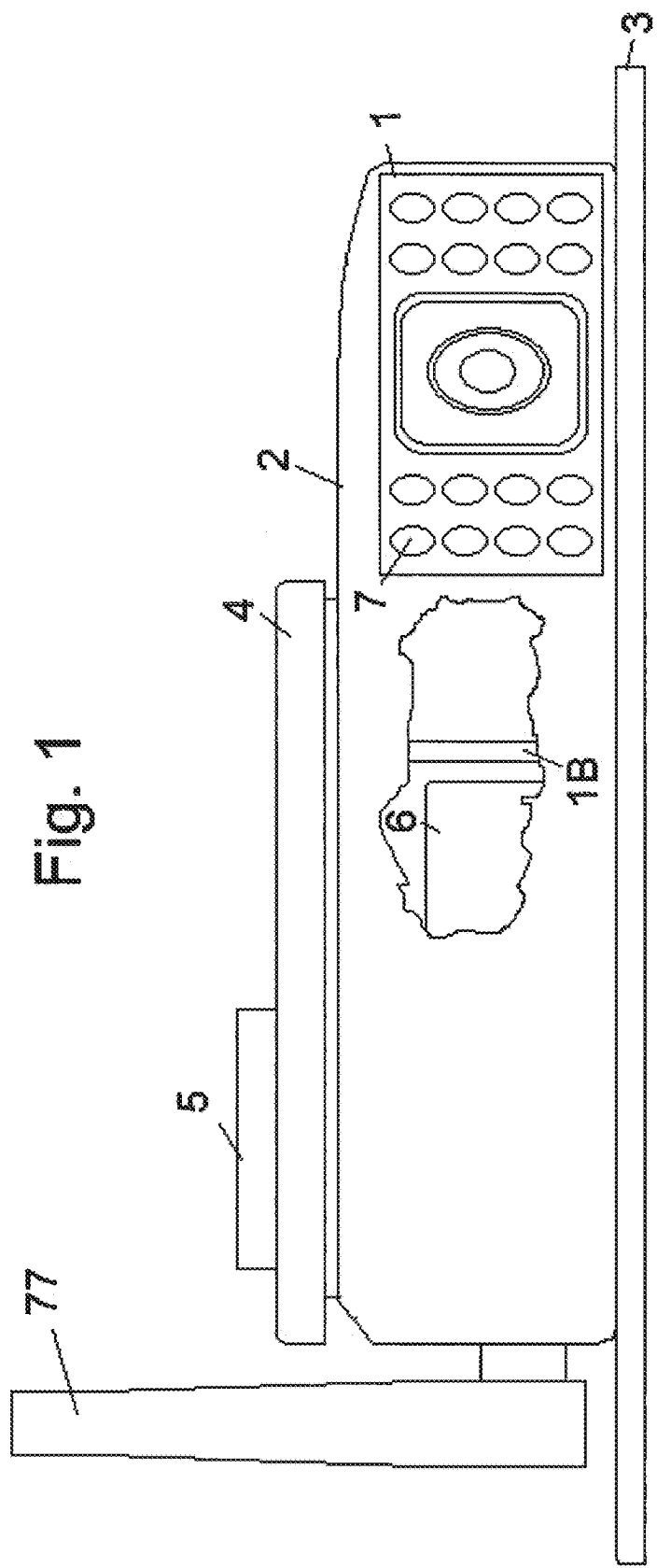

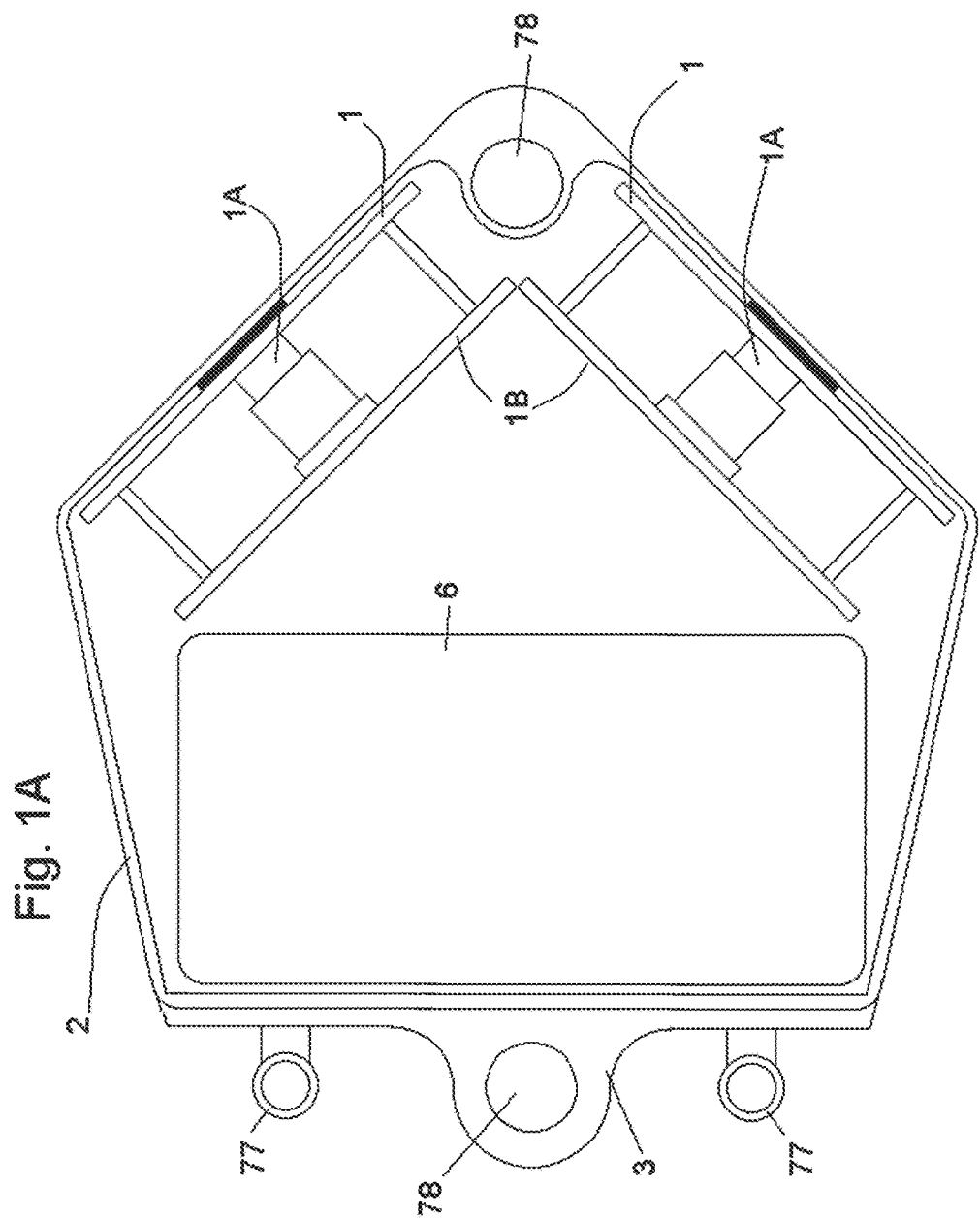

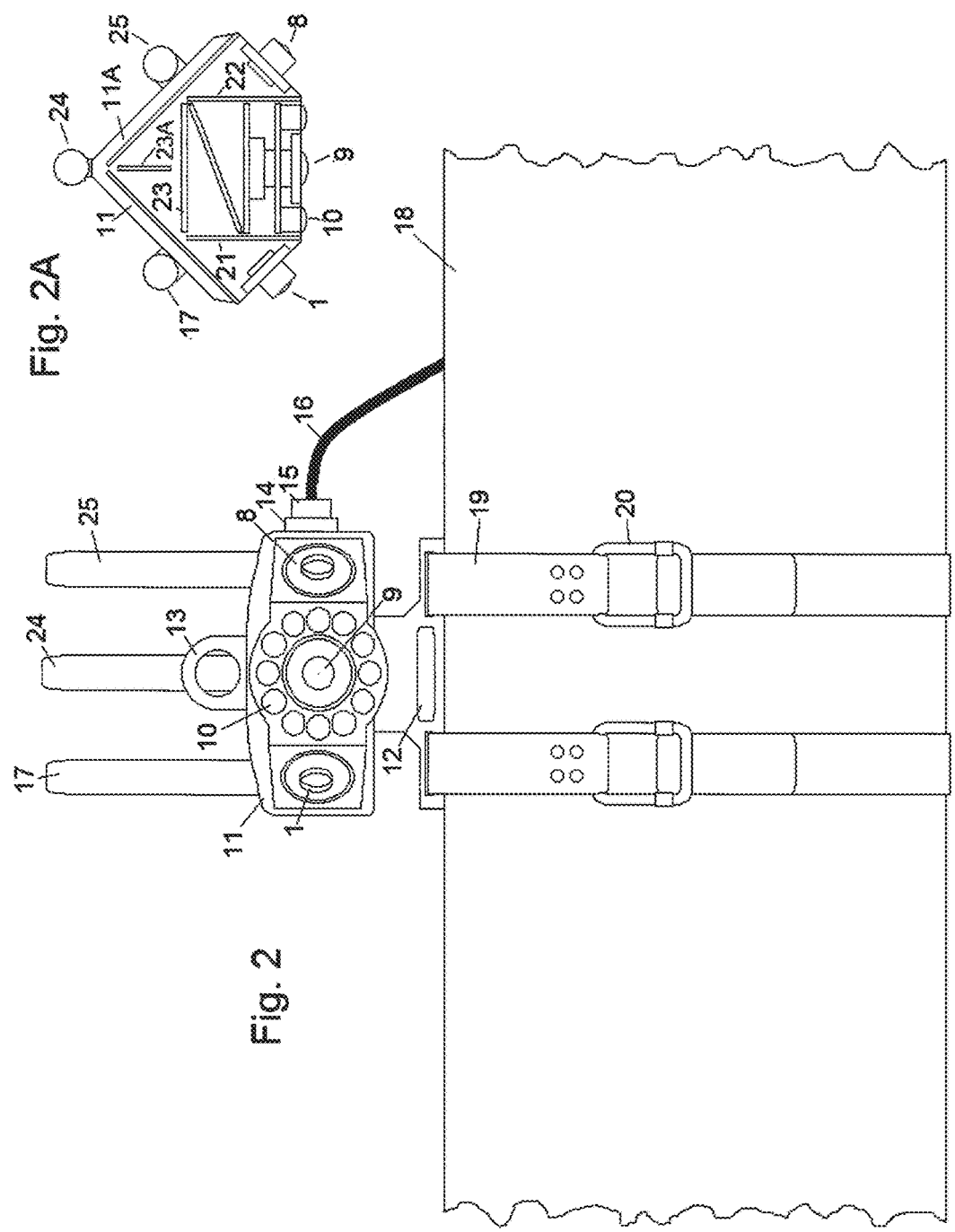

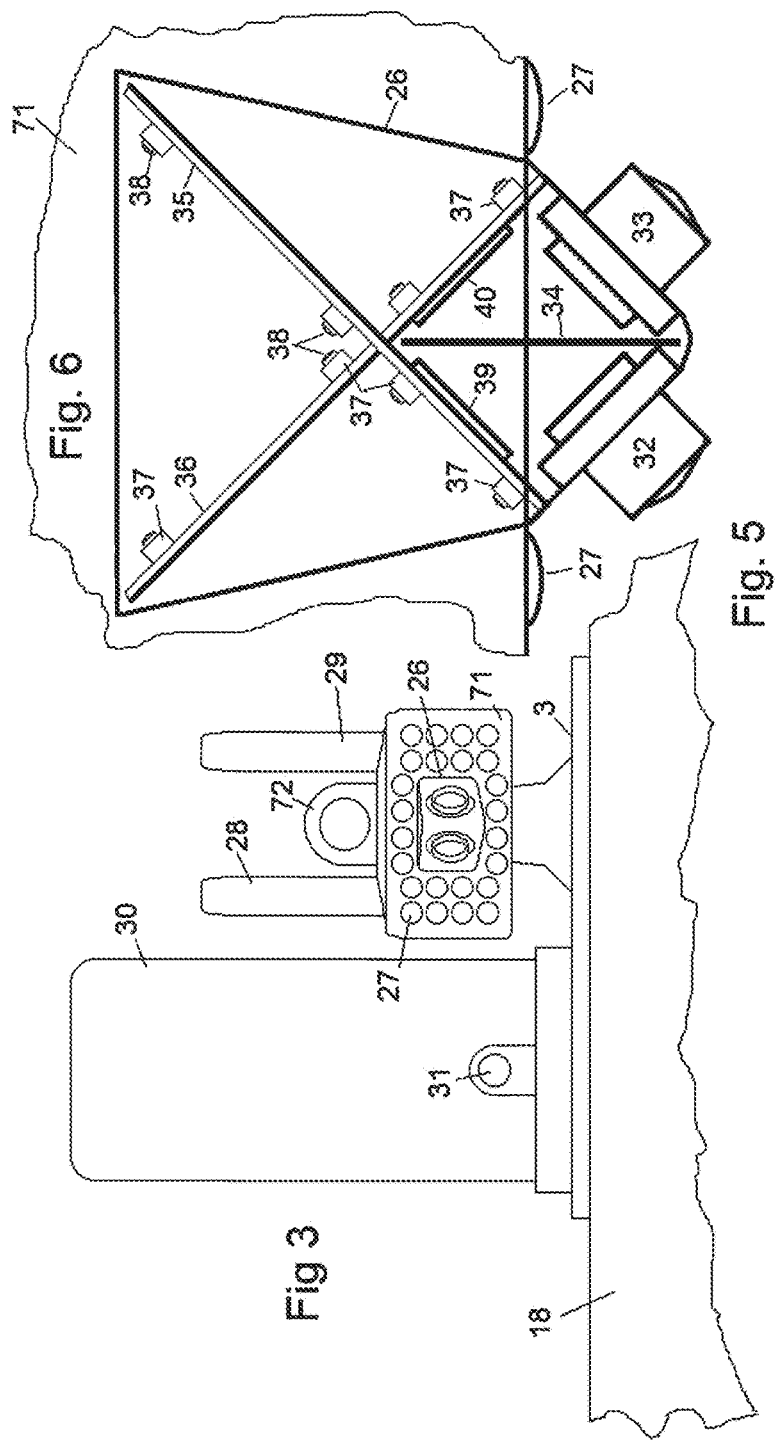

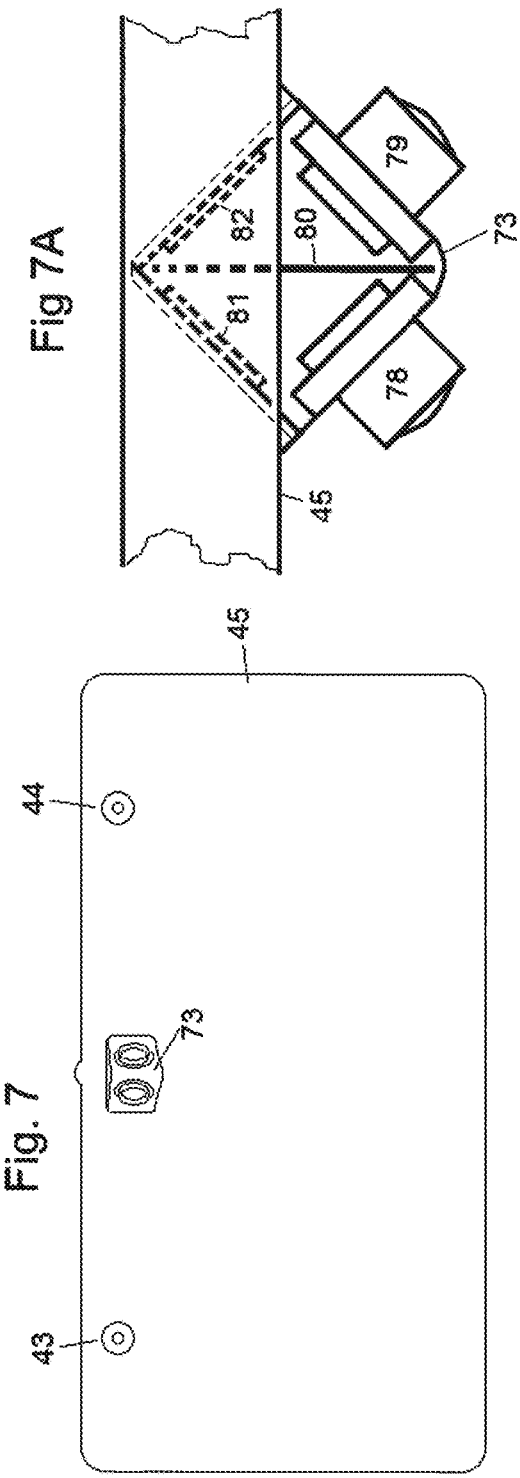
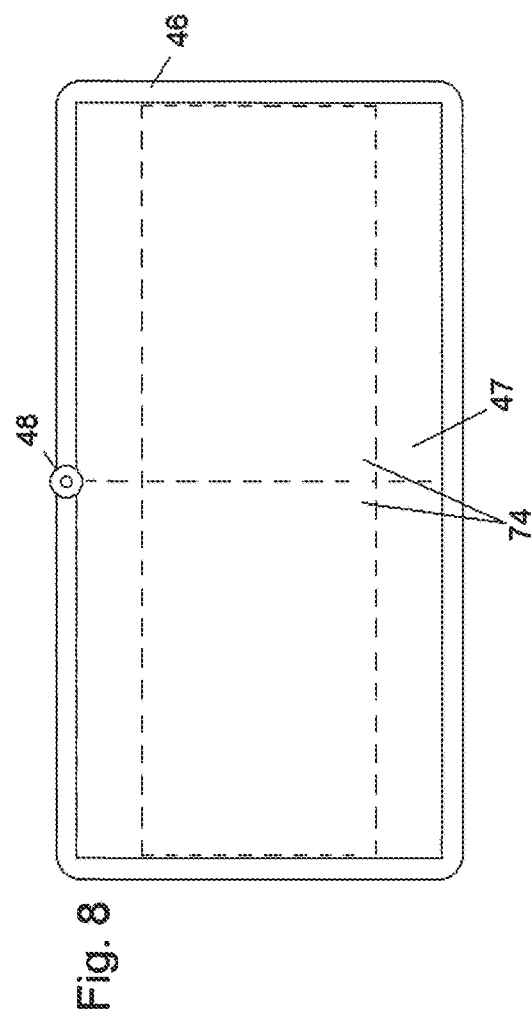

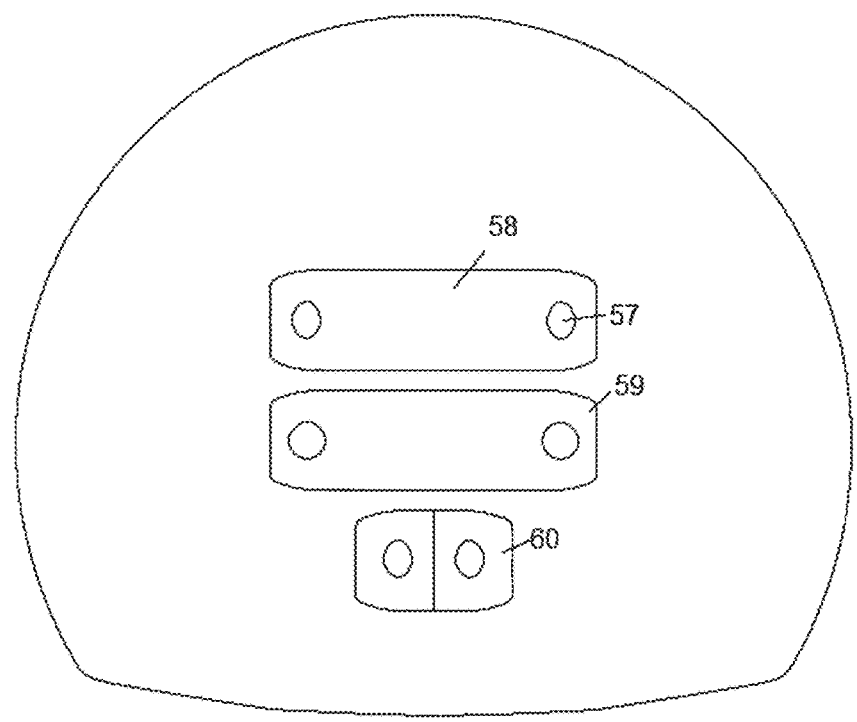
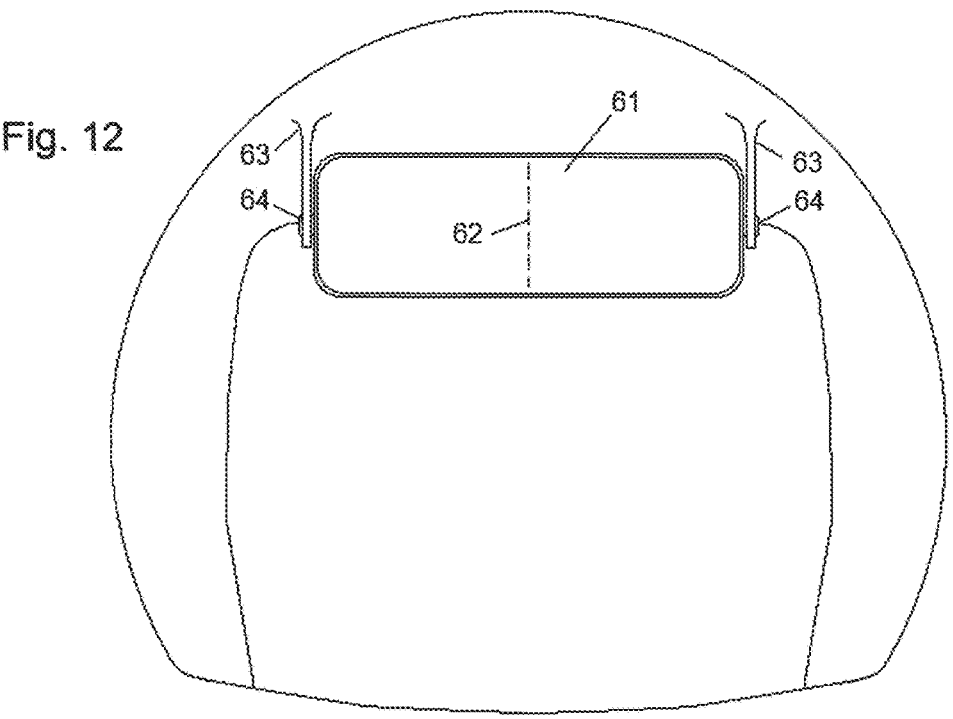

VISION SYSTEMS USING MULTIPLE CAMERAS

FIELD OF THE INVENTION

This invention relates to a visual system comprising multiple cameras in order to provide a distortion free panoramic image covering a 180° field of view, a single frame image, or a three dimensional image.

BACKGROUND OF THE INVENTION

Camera systems are known for a variety of applications, from security to surveillance to automobile navigation and safety. In each case, it is preferable to provide a system that has a wide field of view, covering most, if not all, of the area to be monitored. In such cases, more than one camera may be used to ensure that the correct field of view can be captured. Some examples of systems including multiple cameras include U.S. Pat. Nos. 7,183,549 and 7,381,952 and U.S. Patent Pub. Nos. 2004/0119822 and 2006/0139475. However, when displaying the results from multiple cameras, which inherently point in slightly different directions, it is likely that those images will be somewhat mismatched. For systems, such as security systems, that provide at least one monitor to display the images captured by each camera, this may not be of concern. However, in systems where the entire collection of images is to be integrated for display in a single view, the slightly misaligned images are likely to produce a distorted image. This is often manifested as a "fish-eye" appearance, or an image that looks crookedly "stitched" together.

Further, many of these applications and patents disclose relatively sophisticated vision system comprising complicated hardware to operate a battery of cameras, or a single camera with digital capabilities of countless combinations and solutions and are therefore relatively expensive.

A typical mage-capturing CCTV system or camera is basically a set of lenses focusing on a light sensitive sensor installed on a printed circuit board. Each image is captured from the viewpoint of a specific camera, determined by the direction in which its lens points. Two cameras placed side by side will therefore produce slightly different images, while cameras separated by a longer distance, for example placed on opposite ends of a vehicle bumper, or cameras pointing in different directions, will therefore produce more obviously varying images of the scenes in front of their lenses. However, in many situations, it is preferable to capture images from several cameras while still producing an image that accurately reflects the entire actual scene being monitored by the multiple cameras. That is, it is preferable to provide a system that can capture and collate images from multiple cameras and optically integrate those images into a seamless image that appears to be from a single camera or single point of view but which covers a much larger area. The focal point of the scene is consistent in all situations, and provides excellent image perspective, regardless of any movement of the cameras.

It is therefore an object of this invention to provide a visual system comprising multiple cameras that overcomes some or all of the foregoing difficulties.

It is a further object of the invention to provide a visual system which minimizes distortion in the display of images provided by multiple cameras, thereby minimizing or eliminating a fish-eye appearance of the displayed images.

It is a further object of the invention to provide a visual system comprising multiple cameras in order to provide the viewer with a panoramic vision of 180° field of view with a minimum or no distortion of image.

It is a further object of the invention to provide a multi-camera system with multiple display options.

It is a further object of the invention to provide a multi-camera system capable of capturing panoramic still or video stream of images from the same point-of-view.

It is further an object of the invention to provide a wearable vision/display system capable of recording and/or displaying panoramic or a stereovision images selectively.

It is a further object of the invention to provide a device to mechanically adjust the images obtained from a multi-camera vision system to form a single panoramic view.

It is a further object of the invention to provide a visual system that incorporates a radar sensor, in order to activate a video stream on the display monitor and to enhance driver awareness and improve road safety.

These and other objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

The invention comprises devices providing a distortion free panoramic covering 180° of field of view, a single frame or three dimensional images on a monitor, shown side-by-side and/or in different display format. The monitor may display simultaneous and/or alternating appearances of one or more images satisfying the user's commands or customized pre-settings. The cameras may be energized by batteries or connected to the vehicle's wiring system on any mobile embodiment of this application. The assemblies may be permanently or temporarily secured to a suitable surface or component of the vehicle by any suitable mechanical means such as a locking type plier, clamp or other kind of securing device. It may also be permanently or temporarily attached via a suitable fastening means such as Velcro®, suction cups, magnets, tape, glue, rivets and/or bolts, or may be permanently attached by suitable means such as welding. The assembly communicates with a display monitor placed in front of the driver for both backup auxiliary vision purposes and for general monitoring and awareness of road conditions and other circumstances when the vehicle is moving forward or is stationary. It is contemplated that the devices will either be portable or permanently installed on any vehicle as OEM (Original Equipment Material) equipment, or available as an aftermarket product. In similar configurations, the system could also be used for mainly stationary applications, such as being mounted on a pole, wall, bracket, fixture, etc. for security/surveillance purposes to provide an undistorted 180° (or even 360° should two units be installed back-to-back) field of view image on a monitor. It could also be applied on laptop or tablet screens, webcams or any other type of camera system. In alternative configurations, the devices may provide a person with a stereovision effect resembling a real life three-dimensional view.

In one aspect, the invention comprises a vision system to provide a wide field of view image to a user with minimal image distortion, comprising at least two cameras, each of which provides a camera image; and at least one light sensor associated with each of said cameras to receive said camera image and to transmit said camera image to a monitor; wherein said monitor displays each of said camera images simultaneously as said wide field of view image. The system may further comprise a plurality of infrared light-emitting diodes to provide illumination to said cameras in low light conditions. The cameras may be directed at an angle of approximately 90 degrees apart from each other. The vision system may include a housing for said cameras and said light sensors, and the housing may be mountable to a vehicle. The system may be wired and/or wireless, in which case it may further comprise at least one transmitting antenna associated with said light sensors and adapted to communicate wirelessly with a receiving antenna installed on said vehicle to transmit said camera image to said monitor. The system may comprise at least one radar sensor near said cameras to activate a component of said vision system when a specified condition occurs and/or to activate a visual or audible warning for said user when a specified condition occurs.

In another aspect, the invention comprises a vision system to provide a wide field of view image to a user with minimal image distortion, comprising at least two cameras, each of which provides a camera image; at least one mirror, onto which each camera image is reflected; and at least one light sensor associated with each of said mirrors to receive said reflected camera image from said mirror and to transmit said reflected camera image to a monitor; wherein said monitor displays each of said reflected camera images simultaneously as said wide field of view image. The mirror may be single or double sided. The light sensor(s) may be supported on at least one printed circuit board. At least one adjusting device may be provided on said printed circuit board to adjust a position of said light sensor relative to said printed circuit board.

In further aspects, the system may comprise a plurality of infrared light-emitting diodes to provide illumination to said cameras in low light conditions. The vision system may include a housing for said cameras, mirrors and said light sensors, and the housing may be mountable to a vehicle. The system may be wired and/or wireless, in which case it may further comprise at least one transmitting antenna associated with said light sensors and adapted to communicate wirelessly with a receiving antenna installed on said vehicle to transmit said camera image to said monitor. The system may comprise at least one radar sensor near said cameras to activate a component of said vision system when a specified condition occurs and/or to activate a visual or audible warning for said user when a specified condition occurs.

In yet further aspects, the vision system may comprise three cameras. In this situation, two of the cameras may provide camera images to one or more mirrors, while the camera image provided by the third camera is received by the associated light sensor and transmitted to said monitor.

In another aspect, the invention comprises a vision system to record and/or display a panoramic or stereovision image comprising a unit body having a front display side and an opposed rear side; a display screen on said front display side, adapted to display two images side by side; and a pair of cameras on the rear side of the unit, near opposed ends of said rear side, that both point in the same direction. The display screen may also comprise at least one sub-screen, and also include at least two cameras on said opposed rear side, each of which provides a camera image; at least one mirror, onto which each camera image is reflected; and at least one light sensor associated with each of said mirrors to receive said reflected camera image from said mirror and to transmit said reflected camera image to said at least one sub-screen. A front-facing lens may be provided on said front display side.

In a further aspect, the vision system may be provided in an eyeglass style, comprising a frame comprising a pair of lenses supported by a pair of earpieces; a plurality of brackets extending from said frame and terminating in a detachable holding mechanism; said holding mechanism being adapted to secure said unit body. An opaque wall extending between said frame and said display screen, wherein said two images are separated by said opaque wall may be provided to visually separate the images on the display screens. A nose cup may be provided in said opaque wall.

In another aspect, the invention comprises a wearable vision system for a headwear article, comprising a headwear body having front and rear portions; at least one camera assembly in said rear portion, to capture camera images behind a wearer's line of sight; and a display screen on said front portion. The camera assembly may comprise one or more of the following: (1) at least two cameras, each of which provides a camera image; and at least one light sensor associated with each of said cameras to receive said camera image and to transmit said camera image to said display screen; wherein said display screen displays each of said camera images simultaneously; (2) at least two cameras, each of which provides a camera image; at least one mirror, onto which each camera image is reflected; and at least one light sensor associated with each of said mirrors to receive said reflected camera image from said mirror and to transmit said reflected camera image to said display screen; wherein said display screen displays each of said reflected camera images simultaneously as said wide field of view image; and (3) a pair of opposed cameras that both point in the same direction.

In another aspect, the invention comprises a device for use in a multi-camera vision system to mechanically adjust the images provided by said cameras to form a single optically integrated view, comprising a support base connectable between a printed circuit board and an image sensor for one or more of said cameras, said support base being selectively rotatable on said printed circuit board; an adjacent gear connected to said printed circuit board; wherein rotation of said gear causes rotation of said support base and adjusts said image sensor, thereby producing said optically integrated view. The support base may be a circular disk. The gear may be adjustable with means such as a wrench.

The foregoing may cover only some of the aspects of the invention. Other aspects of the invention may be appreciated by reference to the following description of at least one preferred mode for carrying out the invention in terms of one or more examples. The following mode(s) for carrying out the invention is not a definition of the invention itself, but is only an example that embodies the inventive features of the invention.

BRIEF DESCRIPTION OF THE DRAWINGS

At least one mode for carrying out the invention in terms of one or more examples will be described by reference to the drawings thereof in which:

FIG. 1 is a side view of a first embodiment of the invention;

FIG. 1A is a top view of the embodiment of the invention shown in FIG. 1;

FIG. 2 is a front view of a second embodiment of the invention;

FIG. 2A is a top view of the embodiment of the invention shown in FIG. 2;

FIG. 3 is a front view of a third embodiment of the invention;

FIG. 4 is a top view of the embodiment of the invention shown in FIG. 3;

FIG. 5 is a view of the circuit boards of the embodiment of the invention shown in FIG. 3;

FIG. 6 is an enlarged view of the assembly of FIG. 4;

FIG. 7 is a rear view of a smart phone configuration of an embodiment of the invention;

FIG. 7A is an enlarged view of the camera assembly of the embodiment of the invention shown in FIG. 7;

FIG. 8 is a front view of the embodiment of FIG. 7;

FIG. 11 is a rear view of a helmet, illustrating an application for the invention;

FIG. 12 is an internal view of the helmet of FIG. 11; and

Figure 10:
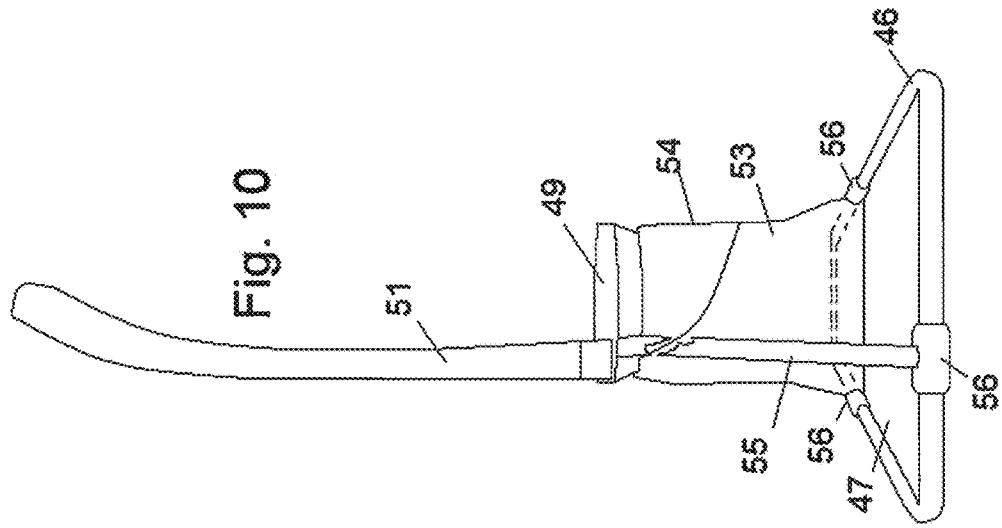
FIG. 10 is a side view of the eyeglasses of FIG. 9.

DETAILED DESCRIPTION OF AT LEAST ONE MODE FOR CARRYING OUT THE INVENTION IN TERMS OF EXAMPLE(S)

In a first embodiment, best shown in FIG. 1, the invention comprises a detachable wireless backup vision system designed to be installed on a rear portion, typically a bumper, of a vehicle such as a car, truck, trailer, tractor-trailer, bus or a commercial vehicle. The system comprises a twin camera assembly, wherein the cameras are directed at an angle of approximately 90 degrees apart from each other, in order to provide an almost distortion-free rear view (unlike fish-eye lenses) to the driver, covering a full 180° behind it, including adjacent lanes on both sides of the vehicle, and covering rear cross-traffic in any possible situation.

FIGS. 1 and 1A show an embodiment of the invention, comprising an assembly including twin cameras 1, which have lens mounts 1A to receive images and project them onto light sensors installed on printed circuit boards 1B. The camera assembly is mounted in a housing 2, which is supported by chassis 3 and covered by lid 4. A locking mechanism such as locking tab 5 may be provided to allow access to the housing 2, and to a battery 6 within the housing 2 to provide power to the cameras 1. One or both of the cameras 1 may be equipped with infrared light-emitting diodes 7 for night vision.

In this embodiment, transmitting antennas 77 may be connected to the printed circuit boards 1B of cameras 1, to communicate wirelessly with a receiving antenna installed in the back of a tractor of an eighteen-wheeler or somewhere on the chassis of a straight truck or bus. That antenna may be wired to a display system, such as a split-image viewing monitor placed somewhere in front of the driver to provide a panoramic view of the back of the vehicle. The display might have quad-view capability in order to give the driver a side rear view of the vehicle at the same time, captured from additional cameras placed close to the side mirrors pointing toward the back of the vehicle. The assembly may be mounted on chassis 3 which may be installed on top of the rear bumper of the vehicle and tightened by a suitable connector, such as a U-lock bar similar to ones used by bikers, which may have springs to penetrate the orifices 78 of chassis 3. The system may also have a wired version with the cameras connected to one or more cables attached to the monitor, in which case the batteries and antennas may be omitted. Other wired versions may have cameras with their own weatherproof enclosures, eliminating the need for the housing 2.

It is contemplated that this particular model may also be used in surveillance/security applications, with or without the housing 2. Other accessories, such as a microphone or one or more transmitting antennas may also be provided, depending on the intended application, but are not shown for clarity.

In another embodiment, best shown in FIGS. 2 and 2A, the invention comprises an assembly having a housing with three cameras. This arrangement provides either a panoramic view by using only the side cameras (which would give a similar view as the twin cameras described in the embodiment shown in FIG. 1), or may assemble the images from all three cameras to provide a panoramic collage.

FIG. 2 is a front view of an assembly with three cameras 1, 8, 9 installed on the rear bumper or any other suitable area of the vehicle within a housing 11. This model is preferably connected to the wiring system of the vehicle, for example through electrical connector 14 and plug 15 connected to the vehicle's system via wiring 16, to energize the cameras, but may also be provided with a battery box (not shown) as a backup source of power, or may be provided with a battery instead of an electrical connector for independent function. One or more infrared light-emitting diodes 10 may be provided for operation at night or in low light conditions. Housing 11 is attachable to the vehicle by any suitable connector means such as by providing one or more slots 12 to accommodate an attachment mechanism to secure the system on the bumper 18. In the example shown, belts 19 may be used to strap the system to the bumper 18, secured by buckles 20. Additional security means, such as optional hardened loop 13, may be provided to accommodate a securing device such as a rope, chain or other suitable means, to lock the assembly to the bumper with a padlock, U-lock or other suitable locking device.

One or more transmitting antennas 17, 24, 25 may be provided in a wireless system to send the images received by the cameras 1, 8, 9 to the associated display system (not shown). The antennas and batteries may be omitted in a wired system.

FIG. 2A is an upper view of the assembly of FIG. 2, showing the camera 1 which captures images that may then be reflected by mirror 21 and projected onto the light sensor of circuit board 11, which in turn transmits the images through a wired connection or wirelessly to a display for a user. On the other side of the assembly, images captured by lens 8 may be reflected by mirror 22 onto a light sensor of circuit board 11A, and is similarly transmitted to the display. In the case of three cameras, the side mirrors would determine the inner borders of images captured by the side cameras and spread out by the center image captured by the central camera, providing also a same-point-of-view effect. Circuit board 23 provides the electronic circuitry required for central camera 9; it may be arranged the way is shown on the drawing or any other alternative manner. One or more additional circuit boards 23A may be provided to hold extra components of one, two or all cameras 1, 8, 9, if necessary.

Electronic display settings may be provided to allow a user to select desired features or display modes, such as displaying one, two or all three images at the same time, alternating their appearance in a different combination on demand or automatically on chosen preset intervals, fade-in/out, picture-in-picture, etc. The camera specifications may differ from one another, for example, to have one or two provide an image with better resolution than the others, such as for investigative purposes. The addition of extra cameras installed close to the side mirrors of a vehicle may give the driver a full 360° view all around the vehicle including the road ahead, if all images are displayed on the monitor at the same time. That may become a big plus on the safety of the roads, ensuring that drivers do not have to glance at their side mirrors every few seconds during the trip, as is typically taught at driving schools. Extra equipment such as digital video recorders with GPS and alerts transmitted via the Internet could be connected to the system for investigative purposes. The same applies to using one or more radar sensors attached close to the cameras for collision avoidance warning reasons. The radar sensor may be set up to activate the visual display system when a specified condition occurs, such as something coming within a certain distance of the sensor. Instead or in addition, the radar sensor may be set to activate the cameras or to provide a visual or audible warning if a specified condition arises.

In another embodiment, best shown in FIGS. 3-6, the invention comprises a twin lens camera system in a more compact assembly, which is compatible with being used on a vehicle. The assembly, contained by enclosure 71, may be supported by plate 3, which is in turn securely attached to the vehicle by any suitable means such as clamps, welds, bolts, straps, etc. to install the equipment to the vehicle bumper 18 (or any other suitable area of the vehicle) temporarily or permanently. The enclosure 71 may also hold one or more optional infrared light-emitting diodes 27 to provide illumination in dark scenarios. In a wireless embodiment, transmitting antennas 28, 29 may be provided to send images collected by the camera assembly to a display system. A weatherproof enclosure 30 may be provided to contain one or more batteries to power the assembly 26. Enclosure 30 is preferably lockable, such as by button 31 or any other suitable mechanism. Locking means 72 may be provided to be connected to a wire rope or similar securing device to lock the system to the vehicle's bumper 18.

Internally, as best shown in FIGS. 4-6, camera enclosure 26 comprises at least one circuit board for each camera 32, 33. Circuit board 35 comprises a light sensor 39 and an open slot 41, while circuit board 36 comprises light sensor 40 and open slot 42; one or both may comprise a mechanical device 75 to vertically adjust the light sensor in order to improve the panoramic view collected via the sensor, as will be described later. Slots 41, 42 may interlock to form an X, as best seen in FIG. 6; this is the preferred configuration as it will provide approximately a 45° angle through which the double-sided mirror 34 can best provide undistorted images from both cameras 32, 33. Camera 32 captures images, which may be reflected by double-sided mirror 34 and projected onto the sensor 39 on circuit board 35. Images captured by camera 33 on the other side of the camera assembly 26 will be reflected by the other face of the same mirror 34 and projected onto sensor 40 on board 36. A double sided mirror is preferred in order to provide a single point of view panoramic picture that may be displayed simultaneously on a corresponding monitor, while still keeping the overall assembly compact, but it will be understood that an alternative mirror arrangement may be provided.

The circuit boards 35, 36 are secured by any suitable means, such as by vertical cross members 37 that may extend between upper and lower surfaces of camera enclosure 26 and bolts 38, or alternatively held by grooves, brackets and/or slots in the surfaces of enclosure 26, which may also anchor the double face mirror 34. Using more than one of these methods may increase the strength and impact resistance of the unit, while ensuring that the system remains sufficiently compact to serve also as an OEM or aftermarket item installed on automobiles to provide a full adjacent front and/or back view, while complying with North American mandatory requirements.

In order to make the enclosure as small as possible, as well to avoid the need to reroute the whole layout of the circuitry of the printed circuit boards 35, 36 around the open slots 41, 42, the device could be optionally modified by keeping the front portion (cameras 32, 33, mirror 34, the front segment of printed circuit boards 35, 36 plus mechanical adjusting device 75) physically apart from the remainder of the printed circuit boards 35, 36 (behind the vertical lines showing slots 41, 42), arranged in a different manner and interconnected by multi-pin connectors, jumper or ribbon cables, etc. One or both of the mechanical adjusting device(s) 75 may have some or all of its own circuitry installed on, outside of, or partially on and partially outside of, the surface of rotating plate 68 (best shown in FIG. 13) and wired to the rest of the circuit board using flexible connecting cables.

In another embodiment, the invention comprises a camera assembly with two lenses separated from each other, pointing in the same direction and capturing images to be displayed simultaneously side-by-side on the display screen. An attachment installed on the screen frame with a pair of optional enlarging lenses and an opaque vertical wall placed at the center of the monitor to mask the image from the user's other eye, may provide a single three-dimensional image from the twin display.

As best seen in FIGS. 7, 7A and 8, the compact size of the twin camera assembly allows it to be employed in a "smart phone" configuration. Two lenses 43, 44 may be located on a rear side 45 of the unit. The front side of the unit may comprise a display screen 47, surrounded by frame 46, an extension of cover 45, which is capable of displaying two images side by side. A front-facing lens 48 may optionally also be provided for interactive video communication. It will be understood that the display screen 47 could be a flat LCD/LED screen, or could be substituted with a flat or curved lighted vision generated surface of any kind that might exist or appear in the future developments of electronics.

An optional twin camera assembly similar to that shown in FIGS. 3-6 can be added to the unit in order to provide an undistorted panoramic view of the subject to be viewed and/or recorded also in a 180° field of view on sub-screens 74, as in the earlier-described vehicular versions of the invention. The images provided by lenses 43, 44 give a viewpoint that would assist in creating a 3-dimensional image, while the assembly 73 supplies images that would be combined to create a panoramic view. Similar to the embodiment shown in FIGS. 3-6, enclosure 73 holds cameras 78, 79, which project their images onto double-sided mirror 80, which in turn reflects the images on the light sensors 81, 82 respectively.

If the camera assembly shown in FIGS. 7 and 8 is to be used as a peripheral device for a computer system, it may be provided with or without integral cameras, so that it functions much like a video monitor, TV set, movie screen, etc. and may have same or similar appearance, depending on the particular application. Cameras for CCTV and other stereo-vision versions may obviously have different configurations of lenses, circuitry, enclosures, brackets, etc., although the viewing assemblies could look similar to embodiments illustrated herein, with or without cameras as plain viewing monitors to be used with computers, tablets, etc.

Figure 9:
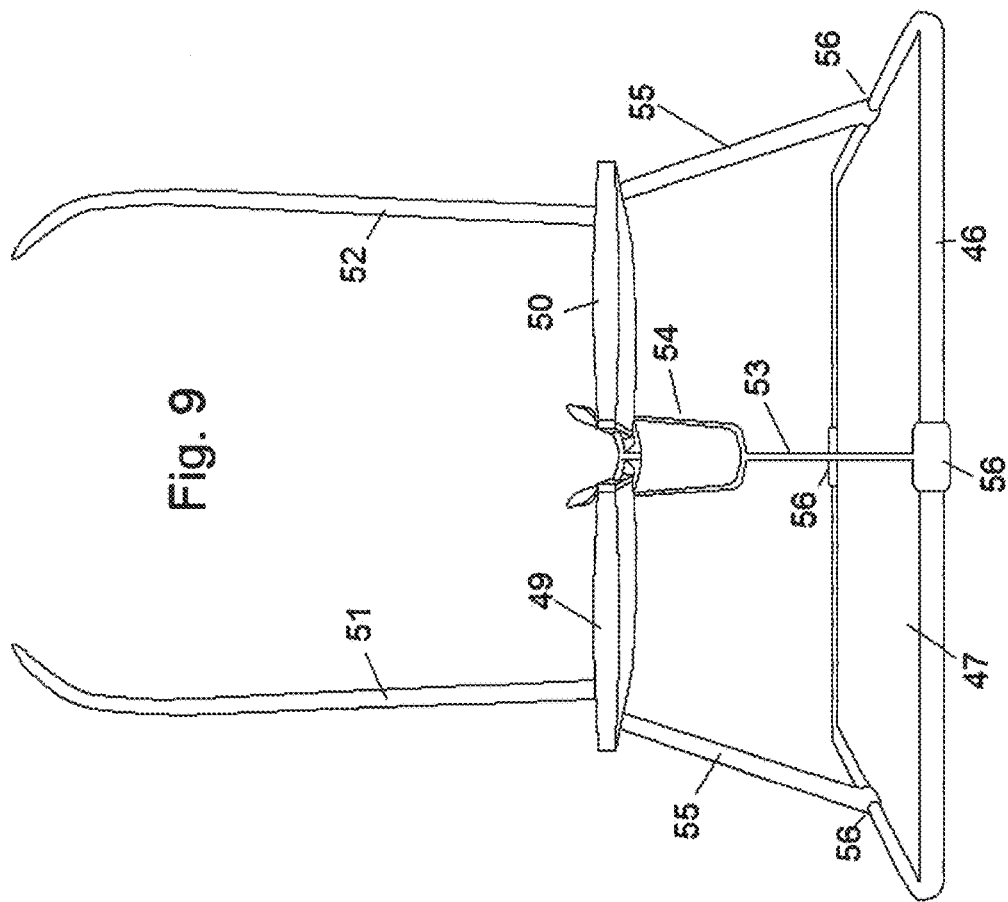
FIG. 9 is a bottom view of a pair of eyeglasses, illustrating an application for the invention.

FIGS. 9 and 10 show an exemplary application for the configuration of the invention shown in FIGS. 7 and 8. The unit is mounted to an eyeglass-style frame comprising lenses 49, 50 and earpieces 51, 52. Brackets 55 extend between lenses 49, 50 and frame 46, securing frame 46 by a suitable detachable holding mechanism, such as clamps 56. Another set of detachable clamps 56 may be provided to connect an opaque central wall 53 to the frame 46. The central wall 53 extends between lenses 49, 50, in order to prevent each eye from seeing the image displayed on the other eye's display 46, 47, thus minimizing the stereo-vision effect. The central wall 53 may be contoured to provide a nose cup 54 for the user's comfort and to help support the weight of the device.

The assembly is preferably light enough to be lifted and comfortably worn like regular spectacles. In order to provide an assembly that is lighter and more comfortable to wear, components such as batteries, controllers, charging cables and other items may be separate from the eyeglasses and connected wirelessly or by wire. Such components may be placed in an enclosure to be carried on a user's belt, wrist, cap, head band or other wearable item, or carried in a user's pocket or other carrying bag.

One application of the assembly is as a wired or wireless peripheral of any CPU, laptop, tablet, cell phone, etc., for watching movies, playing video games, design work, remote vehicle operations, telematics, etc. If kept above or below the user's eye level, it could be worn without disturbing normal activity.

In another application, a vision system may be incorporated in a user's headwear, such as a helmet, cap, headband, etc. As best shown in FIGS. 11 and 12, camera assemblies may be installed in the rear of the body of the headwear, to capture images from behind the user. In the embodiment shown in FIG. 11, three camera assemblies are included: a first camera assembly 58, comprising lenses 57 that point away from each other (as in the embodiment of FIG. 1); a second camera assembly 59 comprising a pair of stereoscopic lenses (similar to the system shown in FIG. 7); and a third camera assembly comprising joint camera lenses 60 (similar to the arrangement shown in FIG. 3). Depending on the needs of the user, a single helmet may be provided with any one or more of these camera assemblies. Other features may include a mechanism to converge or spread the angle of the lenses in sync with the focal distance, providing the user with the ability to selectively move between normal and macro imaging.

FIG. 12 shows the inner portion of the helmet of FIG. 11. A user sees a display screen 61, which may be supported by any necessary hardware, such as brackets 63, and is preferably moveable within the helmet, such as at pivot points 64. The display screen 61 may be divided into two along line 62, for the effects previously mentioned, including 3D. The display screen 61 may also be divided into other configurations, depending on the number and position of the cameras transmitting images, and the display screen may be controllable to allow a user to choose the source of images being seen on the screen, as well as the way those images are displayed. Magnifying lenses (such as the lenses 49, 50 shown only in FIGS. 9 and 10) may be provided between the user's eyes and the display screen 61.

Whenever dealing with a panoramic view formed from a collage of two or more images, the images must be optically integrated to provide a single image wherein each original image properly coincides with the adjacent image. In such cases, it may be necessary to fine tune one or more of the images to provide the desired level of integration. The angle of one or both of the lens mounts may have to be changed. The mirrors may have to be adjusted and attached at different angles. The light sensors on the printed circuit boards may then have to be re-positioned accordingly to satisfy the new settings.

Figure 13:
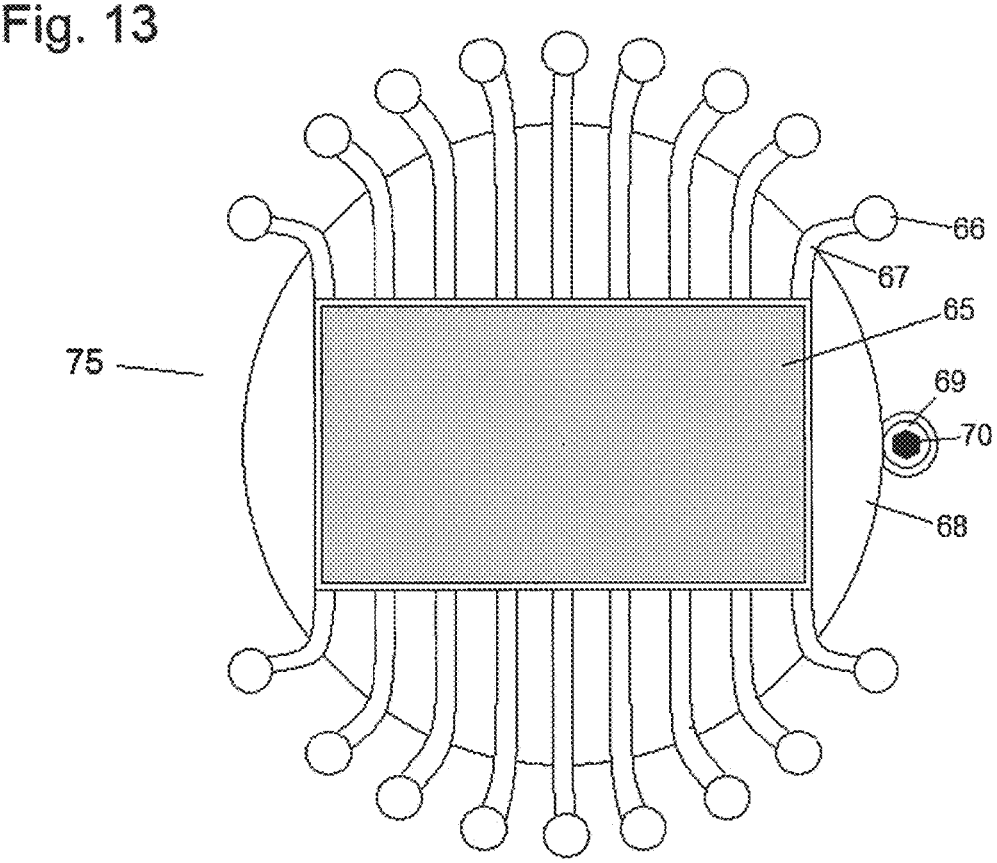
FIG. 13 is a front view of a mechanical device to be used to adjust images provided by embodiments of the invention.

In cases where it would not be practical to adjust the camera lenses in order to make those adjustments, it may be necessary to move the image sensor itself, where it is located in one or more printed circuit boards. FIG. 13 is a mechanical device 75 to be used to vertically adjust a light sensor in order to improve a panoramic view collected from multiple images. The image sensor 65 is connected to a circuit board (not shown) by electrical source pins 66 through flexible wires 67. It is installed on a support base, such as disk 68, which is selectively rotatable, such as by providing gear teeth (not shown) around all or a portion of its circumference. Gear 69 (again, any gear teeth have been omitted for clarity) may be driven by a wrench penetrating the socket 70 to rotate the disk 68, thereby making the required adjustment. It will be understood that the disk 68 may alternatively be rotated by any suitable means, such as hydraulic or pneumatic. After the alignment of both images, the disk 68 may be permanently locked in place by any suitable means, such as one or more bolts engaging the gear teeth, adhesive liquids, tapes, or any other manner for securing the final disk position.

Horizontal alignment, if needed, could be obtained by known systems similar to automotive headlight adjustment devices, which could be used to change the angles between crossed printed circuit boards.

In other refinements of the vision systems, additional sensors may be installed in one or both camera assemblies, or on the receiver/monitor's circuitry, to fine tune image qualities such as brightness, contrast, color hue, etc., to match the appearance of other portions of the panoramic image.

This system may be ideal to apply as OEM equipment on vehicles of any kind replacing single lens rear-view cameras with the advantage of covering 180° of field of horizontal view. Extended applications may also include simulators and driving any manned or unmanned vehicle, vessel, craft, drones, tanks, fire engines, mine sweepers, etc. The system can be designed also for 3D, infrared and/or thermal vision for outdoors, law enforcement and military applications, such as combat, surveillance, hunting or other stealth operations in daylight or total darkness. Peripheral equipment may also be provided, such as securing brackets to be worn by users on their uniforms, body armors or helmets, to be installed on vehicles or crafts, or on mono/bipods/tripods for field or stationary applications.

It will be understood that all of the above-mentioned vision systems could also be used in other applications, such as any portable or non-portable camera, web-camera, camcorder, etc. that is used in shooting, displaying and/or recording of images, to avoid the need of use of wide-angle lenses or multiple shots covering the same viewing areas. For example, it has also application on CCTV security/surveillance systems, replacing single image cameras with undistorted, wide-angle coverage, in a compact package. Systems may be also installed back to back on pillars, poles, brackets, etc. in order to cover 360° of an entire indoor or outdoor surrounding area.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

What is claimed is:

1. A vision system to provide a wide field of view image to a user with minimal image distortion, comprising:
    a first camera having a first lens which captures a first image and transmits said first image to a first side of a double sided mirror placed behind said first lens at a 45 degree angle to said first lens, said first side of said mirror directly reflecting said first image to a first light sensor arranged at a 45 degree angle to said mirror;
    a second camera having a second lens, said second lens being oriented at an angle of approximately 90 degrees to said first lens and which captures a second image and transmits said second image to a second side or said mirror, said mirror also being at a 45 degree angle to said second lens, said second side of said mirror directly reflecting said second image to a second light sensor arranged at a 45 degree angle to said mirror and
    a communication system through which each of said light sensors transmits said images to a monitor;
    wherein said monitor simultaneously displays each of said images directly adjacent to one another as said wide field of view image.

2. The vision system of claim 1, further comprising a plurality of infrared light-emitting diodes to provide illumination to said cameras in low light conditions.

3. The vision system of claim 1, further comprising a housing for said cameras, said mirrors and said light sensors.

4. The vision system of claim 3, further comprising a connector to mount said housing to a vehicle.

5. The vision system of claim 4, wherein said communication system comprises at least one transmitting antenna associated with said light sensors and adapted to transmit said images to said monitor.

6. The vision system of claim 1, further comprising at least one sensor near said cameras to activate a component of said vision system when a specified condition occurs.

7. The vision system of claim 1, further comprising at least one sensor near said cameras to activate a visual or audible warning for said user when a specified condition occurs.

8. The vision system of claim 1 wherein each of said light sensors is supported on a printed circuit board.

9. The vision system of claim 8 further comprising at least one manual adjusting device on at least one of said printed circuit boards to adjust a position of one of said light sensors relative to said printed circuit board.

10. The vision system of claim 3,
    wherein said housing comprises a unit body having a front display side and an opposed rear side; and
    wherein said monitor comprises a display screen on said front display side, adapted to display two images side by side.

11. The vision system of claim 10, wherein said display screen further comprises at least one sub-screen, and further comprising:
    at least two cameras on said opposed rear side, each of which provides an image that is transmitted to said sub-screen.

12. The vision system of claim 10, further comprising a front-facing lens on said front display side.

13. The vision system of claim 9, wherein said adjusting device comprises:
    a support base connectable between said printed circuit board and said light sensor, said support base being selectively rotatable with respect to said printed circuit board; and
    an adjacent gear connectable to said printed circuit board;
    wherein manual rotation of said gear causes rotation of said support base and adjusts said light sensor, thereby producing an optically integrated view.

* * * * *